United States Patent [19]
Doole

[11] Patent Number: 5,466,087
[45] Date of Patent: Nov. 14, 1995

[54] TIMBER CONNECTORS

[76] Inventor: Kevin G. Doole, Broads Road, Closeburn, Queensland 4520, Australia

[21] Appl. No.: 129,648

[22] Filed: Sep. 30, 1993

Related U.S. Application Data

[63] Continuation-in-part of Ser. No. 836,336, filed as PCT/AU89/00380, Sept. 5, 1989, abandoned.

[51] Int. Cl.⁶ .................................................. F16B 15/00
[52] U.S. Cl. ..................... 403/406.1; 403/230; 403/283; 403/403; 411/457; 52/665
[58] Field of Search ................. 403/403, 405.1, 403/406.1, 407.1, 283, 282, 233, 234, 235, 230, 398; 411/457, 471, 458, 920, 921; 52/665, 655.1

[56] References Cited

U.S. PATENT DOCUMENTS

| | | |
|---|---|---|
| 2,328,867 | 9/1943 | Veteran. |
| 2,393,715 | 1/1946 | Simonds .................... 411/457 |
| 2,905,986 | 9/1959 | Young ...................... 403/398 |

FOREIGN PATENT DOCUMENTS

| | | |
|---|---|---|
| 60826 | of 1927 | Australia. |
| 252898 | 11/1963 | Australia. |
| 47726 | 4/1972 | Australia. |
| 2684284 | 10/1984 | Australia. |
| 717308 | 1/1932 | France ..................... 411/457 |
| 802546 | 9/1936 | France. |
| 1016865 | 11/1952 | France. |
| 1269903 | 4/1972 | United Kingdom. |

Primary Examiner—Eric K. Nicholson
Assistant Examiner—Harry C. Kim
Attorney, Agent, or Firm—Helfgott & Karas

[57] ABSTRACT

A timber connector (10) is disclosed comprising a pair of spikes (11 and 14) disposed at the ends of a cranked stem portion (12/13). The spikes (11 and 14) may be positioned in vertical planes (17 and 18) extending angularly to one another such that the connector (10) may be used for interconnecting respective face of adjacent timber members (15 and 16) which are perpendicular to one another. The spikes (11 and 14) form acute angles with the portions of the stem (13/13) adjacent thereto and the secondary spike (14) tapers away from the axis of the primary spike (11) towards its outer end (25) whereby the timber members (15 and 16) are drawn together during rotation of the stem portion (12/13) about the driven primary spike (11) as the secondary spike (14) is driven home.

11 Claims, 8 Drawing Sheets

TIMBER CONNECTORS

This is a continuation-in-part of application Ser. No. 07/836,336, filed as PCT/AU89/00380, Sept. 5, 1989, now abandoned.

BACKGROUND

This invention relates to improvements in and relating to timber connectors.

Traditional timber construction utilizes nails to secure joints between timber frame structural members. Such nailed joints generally provide adequate strength since nails are very effective in shear but their poor pull-out resistance has lead to failure particularly as a result of lifting loads such as produced by cyclonic winds. As a result tie down bolts and the like have been incorporated into modern structures to make them able to withstand high wind loadings. While these are effective in use they add to the cost and complexity of such structures.

Gang-nail connector plates are also used to form joints between adjacent structural members however to date these have not provided such secure joints as to preclude the need for additional hold down means to ensure that structures built using such connectors will withstand high wind loadings. In addition many types of gang-nail connectors are expensive and suited only to specialised applications.

Other forms of connectors, in the form of cranked nails have been provided to connect timber components together, however these have not been particularly successful.

This invention aims to provide improved timber connectors which will be reliable and efficient in use.

SUMMARY OF THE INVENTION

With the foregoing in view, this invention in one aspect resides broadly in a unitary connector of a type suitable for connecting together abutting timber components of a wall frame or cross-over junction and having terminating spikes at opposite ends of a cranked stem and each adapted to penetrate a respective one of adjacent orthogonal side faces of abutting components, characterised in that:

the centreline of said cranked stem may be contained in a common vertical plane which contains the centreline of one said spike, which constitutes an anchoring spike, and the centreline of the other said spike forms an included acute angle with the adjacent stem portion and lies in a vertical plane extending angularly to said common vertical plane.

Preferably, the free end of the other spike terminates outside the arc scribed by the inner end of the spike when pivoted about the anchoring spike. It is also preferred that the included acute angle is in the range of 60 to 85 degrees, and more particularly in the range of 75 to 85 degrees.

It is also preferred that the centreline of the other said spike lies in a vertical plane forming an included obtuse angle with said common vertical plane and preferably the included obtuse angle is in the range of 98 to 102 degrees. Suitably the included angle between the cranked stem components is an obtuse angle in the range of 115 and 155 degrees.

If desired one or both said spikes may be formed with a chisel shape sharpened end portion in which a bevel is formed on the face portion of the or each said sharpened end facing the or each other said spike. Preferably the connectors are bent from a length of resilient wire which may be of any suitable cross-section and if desired the stem adjacent the spikes may be planar. For this purpose, the wire may have a circular cross-section which is deformed in the areas adjacent the spikes to provide the flattened face portions or the wire may have a rectangular cross-sectional configuration and be twisted intermediate the spikes. It is also preferred that the connectors for dressed timber components be used in opposed pairs in which the overall lengths vary between left-hand and right-hand versions but wherein their spike lengths remain constant. Alternatively identical dimensions may be used for left-hand and right-hand connectors, the offset being provided by selective placement in use.

Preferably, the difference in overall lengths is at least twice the spike diameter, such that a pair of connectors may be driven into opposed faces of a thin timber member with minimal risk of opposed spikes meeting one another or without undue separation of the timber fibres in a localised region.

In a further embodiment of this invention, the stem may include a loop portion adapted to pass about an elongate member, the loop member constituting the anchoring means, such that the elongate member may be anchored to an adjoining timber member into which the spikes may be driven. Preferably, the loop is an open loop and the stem terminates remote from the spike in a further spike adapted to be driven in spaced relationship to the spike into the adjoining timber member. Preferably, the spikes extend substantially parallel and form acute angles with respective adjacent portions of the stem, such that they may be driven into a common face of the adjoining member. Furthermore it is preferred that the spikes diverge outwardly from a parallel arrangement at an offset beyond parallel of each spike in the order of 5°–12°.

BRIEF DESCRIPTION OF THE DRAWINGS

In order that this invention may be more readily understood and put into practical effect, reference will now be made to the accompanying drawings which illustrate a typical embodiment of the invention, wherein.

DESCRIPTION OF THE EMBODIMENTS

Figure 1:
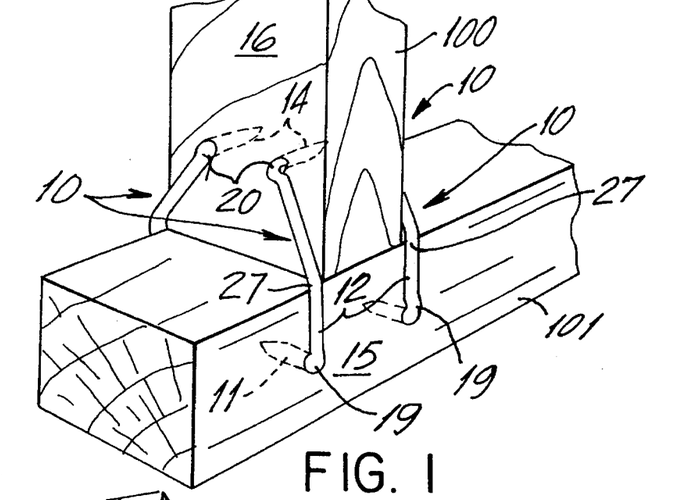
FIG. 1 illustrates a typical stud/plate connection made in accordance with this invention.
Figure 2:
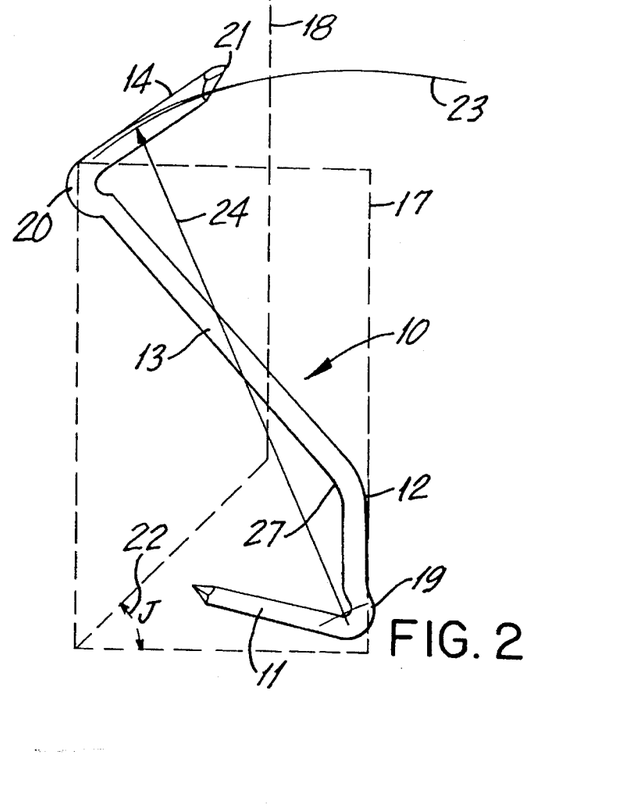
FIG. 2 illustrates a geometric configuration of a left-hand stud/plate connector.

As illustrated in FIGS. 1 and 2, a stud connector 10 includes a cranked stem comprised of the main stem 12 and the bridging stem 13, an anchoring spike 11 arranged in a plane such as the vertical plane illustrated in dotted outline at 17, which contains the cranked stem and from which the anchoring spike 11 extends inwardly. A secondary spike 14 is contained in a further vertical plane, illustrated in dotted outline at 18, which extends at right angle 22 to the plane 17, although as illustrated in the later embodiments the preferred angle "J" between the vertical plane is an obtuse angle.

The intersection of the anchoring spike 11 and the main stem 12 forms an anchor knuckle 19 and the intersection of the secondary spike 14 with the bridging stem 13 forms a secondary knuckle 20.

The arrangement of the connector 10 is such that the distance between the penetrating outer end 21 of the secondary spike 14 and anchor knuckle 19 is greater than the distance between the penetrating part of the secondary knuckle 20 and the anchor knuckle 19. That is, the outer end 21 falls outside an arc 23 described by the radius line 24 drawn about the anchoring spike 11 through the part of the secondary knuckle 20 which penetrates the tube.

Figure 11:
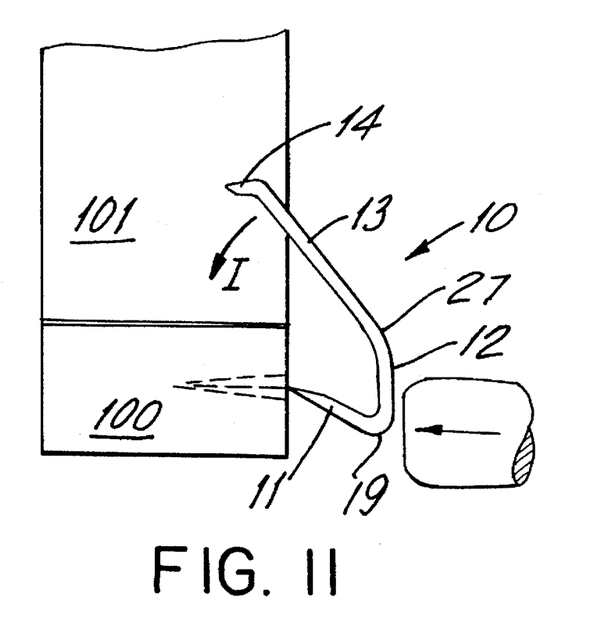
FIG. 11 illustrates the installation of stud/plate connector.

The secondary spike 14 is also arranged at an acute angle to the stem 13 so that in use, after the anchoring spike has been hammered into the plate 15 and the secondary spike 14 pivoted to abut the side face of the stud 16, the spike 14 will enter the stud 16 at right angles or an acute angle to the face and hammering into engagement will cause resilient deflection of the connector 10 about the secondary knuckle 20. This will assist in maintaining a clamp-like grip about the stud 16 and in preventing retraction of the secondary spike as a result of a load applied to the stud 16 tending to separate the stud 16 from the plate 15. A similar clamping action is provided by arranging the anchoring stud at an acute angle to the main stem portion 12. This is illustrated in FIG. 11. Furthermore the acute angle between the spikes and the adjacent stem portions will assist in the prevention of slightly misplaced hamer blows directed towards the spike being deflected by engagement with the adjacent stem portion.

It will be seen from FIG. 1 that the connector 10 is provided in left and right hand versions and is adapted to be installed in opposed pairs at opposite sides of the stud 16 to form a secure connection. The security of the connection is assisted by the geometrical layout described above in that the point of penetration of the secondary spike 14 is further from the anchoring spike 11, about which the connector 10 rotates as the secondary spike 14 is driven home, than is the point of final penetration at the knuckle 20, i.e. at the junction between the spike 14 with the knuckle 20. Thus the act of hammering the secondary spike 14 into the stud 16 will draw the stud down into tight engagement with the plate 15. This action will stretch the cranked stem by resiliently deflecting the crank angle which over time may move resiliently back towards its initial set as the timbers shrink and thereby maintain tension in the connectors.

Figures 3A, 3C:
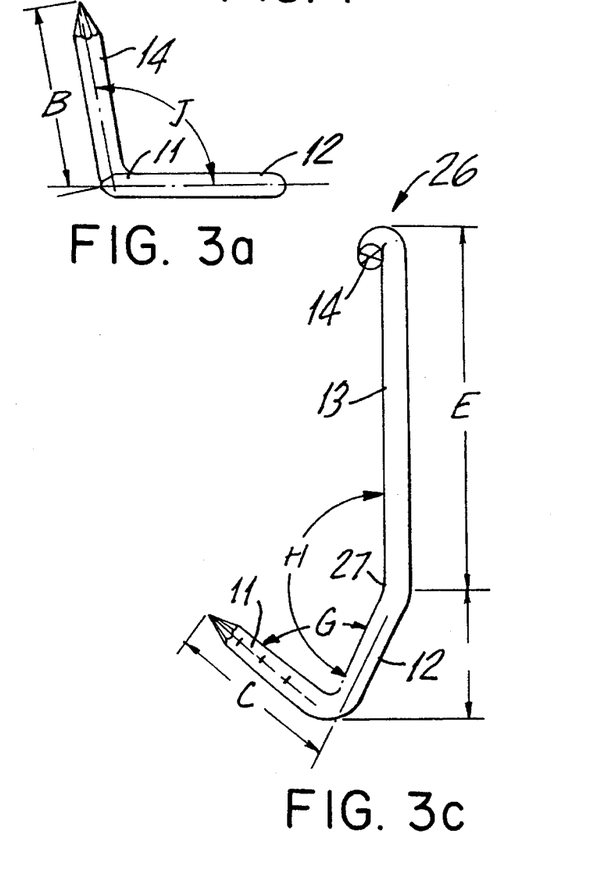
FIG. 3 collectively shows the front, side and end of a preferred form of stud connector.
Figure 3B:
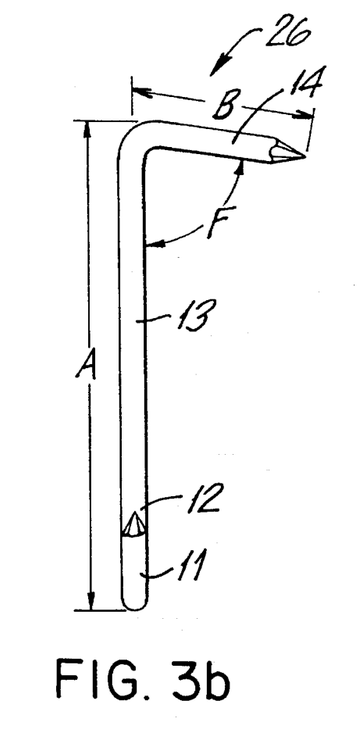

In the preferred form of stud connector 26 illustrated in FIG. 3 like parts are provided with like reference numerals as are the further variations illustrated in FIGS. 4 to 10. A significant difference is that the tensioning effect is further enhanced by forming the secondary spike 14 in a vertical plane 18 disposed at an obtuse angle to the vertical plane 17. That is, the secondary spike 14 is twisted from the vertical plane at right angles to the plane 17 containing the cranked stem and anchoring spike so that the point of penetration of the secondary spike is further from the anchor knuckle 19.

Figure 4:
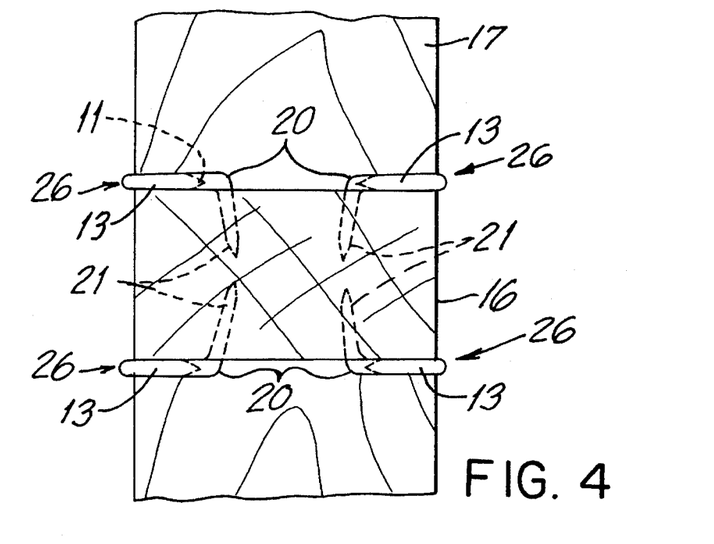
FIG. 4 is a plan view through a connected stud indicating the terminal positions of the secondary spikes.

As illustrated in FIG. 4 the tensioning occurs as a result of the secondary spikes 14 initially entering the side face of the stud 16 at respective positions which require the respective stems 12/13 to deform resiliently to enable the secondary knuckles 20 to follow the path of the outer ends 21 of the spikes 14.

The above general configurations are repeated in all connectors illustrated in FIGS. 3 to 10 and are tabulated below. For reference the following description is given:

the overall length is represented by the letter A;

the secondary spike length is represented by the letter B;

the anchoring spike length is represented by the letter C;

the vertical span of the main stem is represented by the letter D;

the vertical length of bridging stem is represented by the letter E;

the acute angle between the secondary spike and the bridging stem is represented by the letter F;

the acute angle between the anchoring spike and the main stem is represented by the letter G;

the obtuse included angle between main stem and the bridging stem is represented by the letter H, and the obtuse angle between the vertical planes as illustrated in FIG. 2 is represented by the letter J.

Figure 5A:
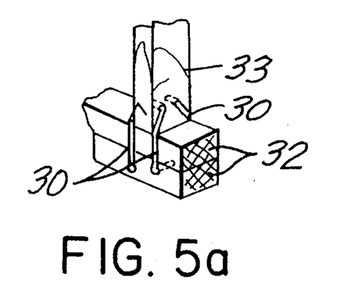
FIG. 5 illustrates the use of a ribbon tie connector in a frame section at (a) and a cross Junction at (b)
Figure 5B:
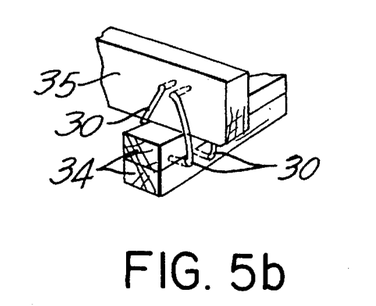

The connector 30 illustrated in FIGS. 4 and 5 is used as a ribbon tie connector 30 for connecting a double plate member 32 to a stud member 33 as shown in FIG. 3, or for connecting a joist 35 to a double bearer 34.

Figure 6A:
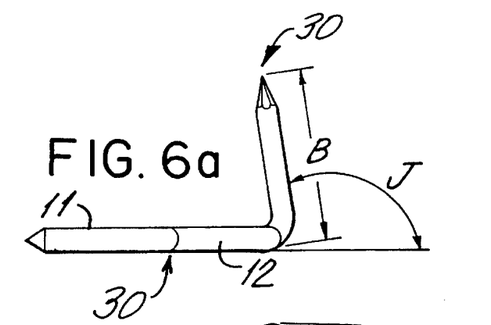
FIG. 6 collectively shows the front, side and underside of a right-hand ribbon tie connector.
Figure 6B:
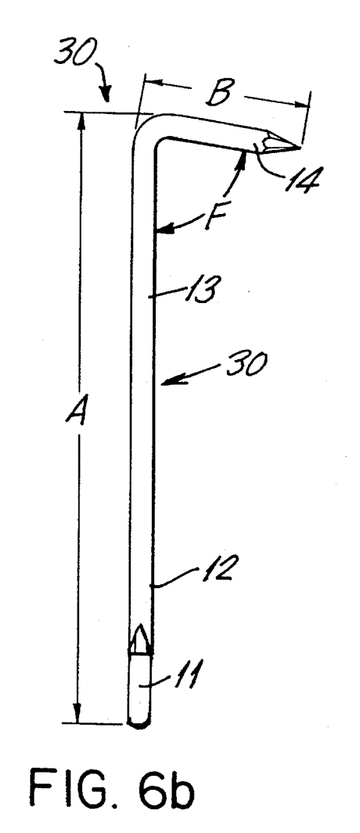
Figure 6C:
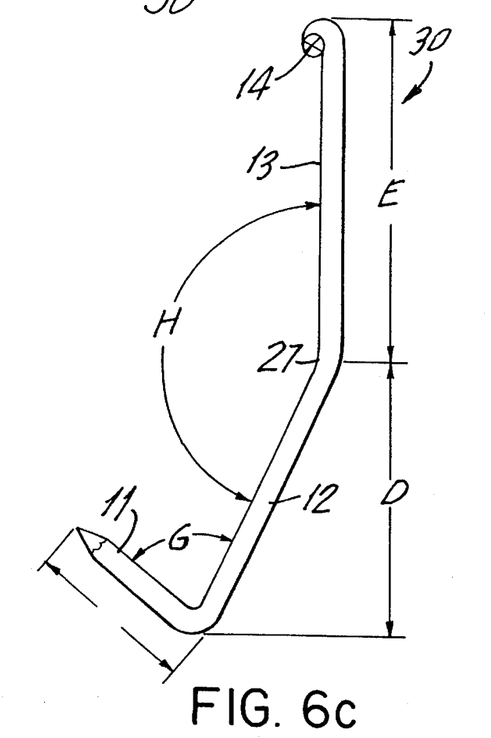
Figure 7A:
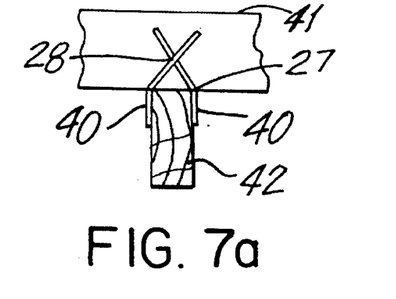
FIG. 7 illustrates the use of a floor bearer connector.
Figure 7B:
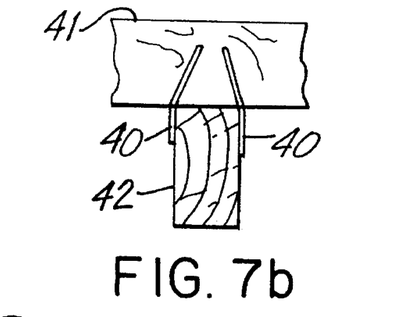

The connector 40 illustrated in FIGS. 6 and 7 is used as a floor bearer connector for connecting a joist 41 to a bearer 42. The cranked stem of floor bearer connector 40 may be cranked to an angle sufficient for the respective connectors 40 to cross over as shown in FIG. 4(a) or alternatively may be as shown in FIG. 4(b).

Figure 8A:
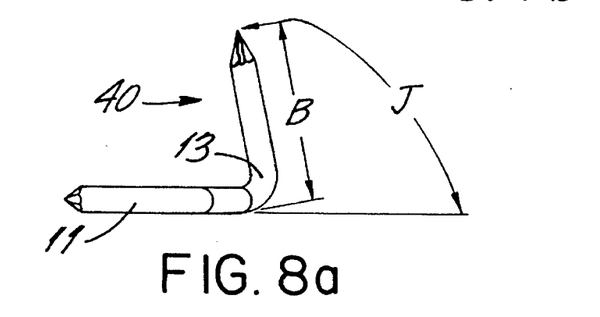
FIG. 8 collectively shows the front, side and underside of a right-hand floor bearer connector.
Figure 8B:
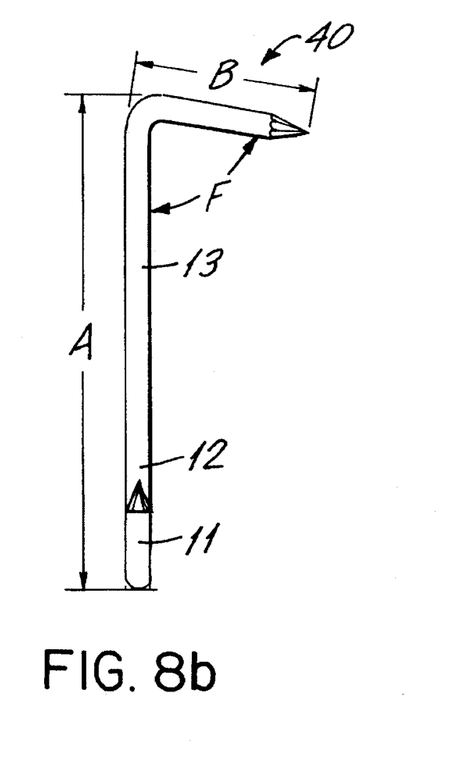
Figure 8C:
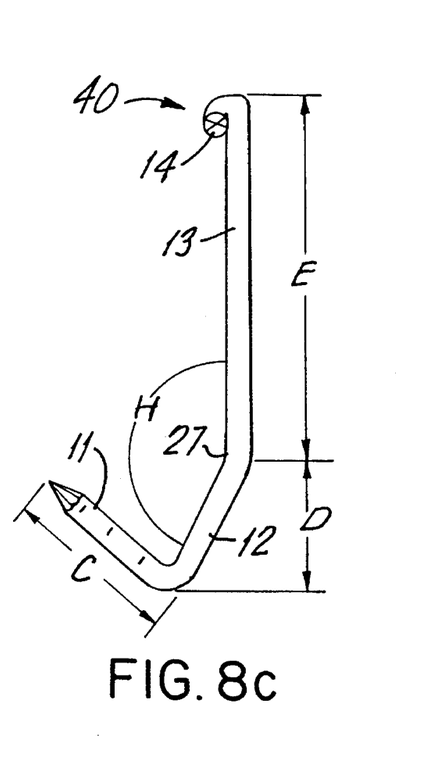
Figure 9A:
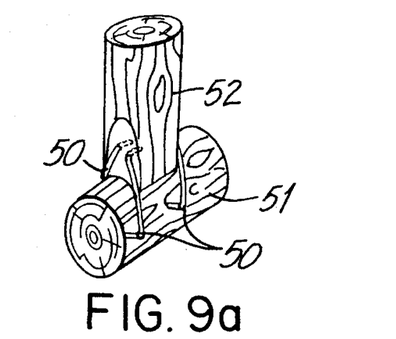
FIG. 9 illustrates the use of a log connector in a frame section at (a) and a cross junction at (b)
Figure 9B:
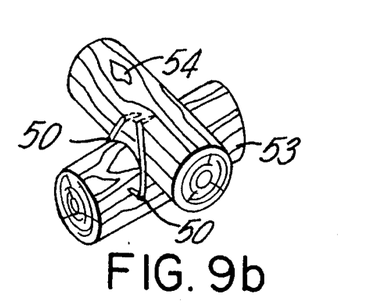
Figure 10A:
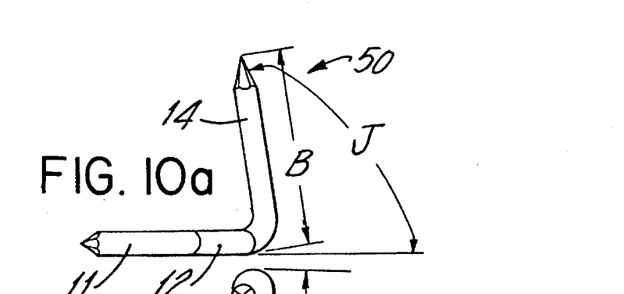
FIG. 10 collectively shows the front, side and underside of a right-hand log connector.
Figure 10B:
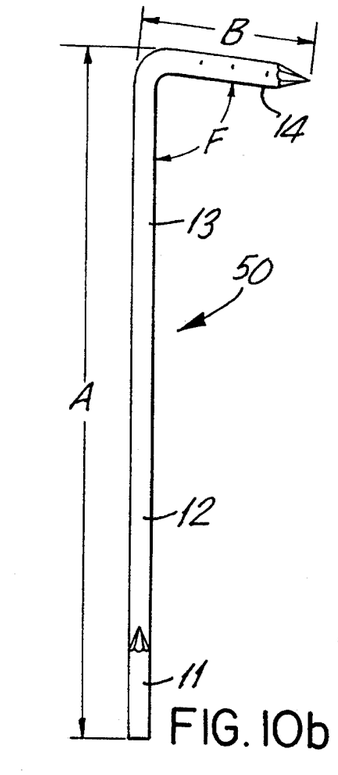
Figure 10C:
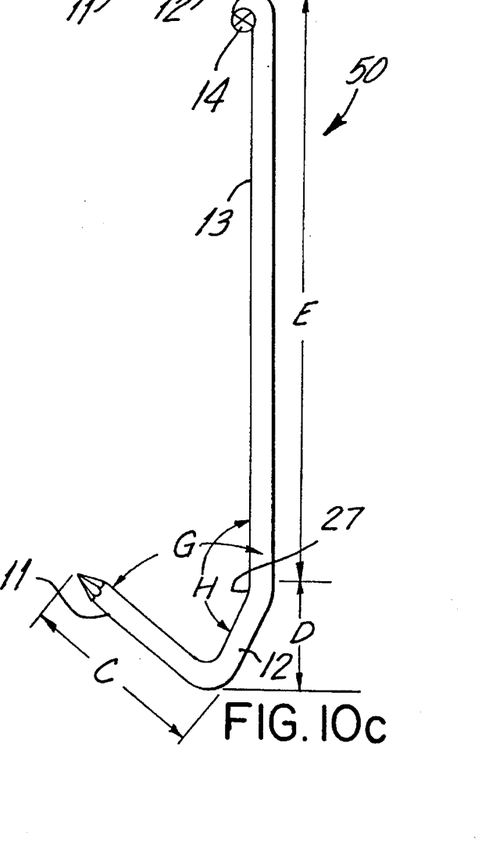

The connector 50 illustrated in FIGS. 8 and 9 is used as a log connector for connecting a log plate 51 to a log stud 52 as shown in FIG. 8(a) or for connecting a log beam 53 to a log joist 54 as shown in FIG. 8(b).

It will be seen from FIGS. 1, 4, 6 and 8 that each type of connector has a corresponding mirror image, or "left handed" version and that the respective component lengths and the angles between adjacent components of the connectors may be selected to provide specialised connectors for different uses. Further the lengths vary between respective pairs of left-hand and right-hand connectors to ensure the opposing points of penetration are at different levels and thus grain boundaries in the timber components.

In TABLE 1 set out below, the lengths of the component parts set forth in the description of the figures above is shown for particular preferred embodiments of the invention. In TABLE 2 thereafter, the respective angles between adjacent component parts is similarly set forth.

TABLE 1

| connector | length (mm) | | | | |
|---|---|---|---|---|---|
| | A | B | C | D | E |
| ribbon tie (left) | 115 | 33 | 33 | 52 | 63 |
| ribbon tie (right) | 121 | 33 | 33 | 53 | 68 |
| floor bearer (left) | 97 | 33 | 33 | 34 | 63 |
| floor bearer (right) | 92 | 33 | 33 | 24 | 68 |
| log (left) | 141 | 38 | 38 | 20 | 120 |

TABLE 1-continued

| connector | length (mm) | | | | |
|---|---|---|---|---|---|
|  | A | B | C | D | E |
| log (right) | 141 | 38 | 38 | 20 | 120 |
| stud (left) | 84 | 33 | 35 | 21 | 63 |
| stud (right) | 92 | 33.8 | 35 | 24 | 68 |

TABLE 2

| connector | length (mm) | | | |
|---|---|---|---|---|
|  | F | G | H | J |
| ribbon tie (left) | 80 | 76 | 154 | 97 |
| ribbon tie (right) | 80 | 76 | 154 | 97 |
| floor bearer (left) | 80 | 76 | 154 | 97 |
| floor bearer (right) | 80 | 76 | 154 | 97 |
| log (left) | 80 | 76 | 116 | 97 |
| log (right) | 80 | 76 | 116 | 97 |
| stud (left) | 80 | 76 | 154 | 95 |
| stud (right) | 80 | 76 | 154 | 95 |

It will be appreciated that the angles given above can be varied to suit the particular application. However in the connectors for dressed timber components the overall lengths vary between left-hand and right-hand versions but their spike lengths remain constant.

The angle G is provided so that when the main stem 12 is supported against the side face of one timber member, the bridging stem 13 extends across the complementary face of the adjacent timber member to enable the connector 10 to be engaged therewith. The anchoring spike 11 is positioned to enter the timber member substantially at right angles to the side face as illustrated in dotted outline. The knee portion 27 of the stem will contact the side face prior to the anchoring spike 11 being driven to the fully home position. After contact between the knee portion 27 and the corner of the timber face occurs, further hammering of the anchoring spike 11 will cause the main stem 12 to deflect resiliently with respect to the anchoring spike 11 to enable the main stem 12 to move inwardly and lie flush against the side face. This resilient deflection will maintain a clamp-like grip about the timber member between the knee portion 27 and the anchoring spike 11 which will maintain the connection in an operative engaged attitude. In addition insertion of the anchoring spike 11 at a downwardly inclined angle is unlikely because of the steep angle at which the bridging stem 13 would have to extend for this to occur.

After the anchoring spike 11 has been hammered into the member to be connected it constitutes an anchoring means about which the stem portion 12 and 13 may rotate to enable the secondary spike 14 to be driven into the other timber member to be connected. Hammer blows may then be directed to the secondary knuckle or junction 20 to drive the secondary spike 14 into the timber member. This action will draw the timber members together as described above. The bridging stem 13 may be kinked at 28 so as to pass over an overlapped connector assembly as illustrated in FIG. 7.

In use, the action of hammering the secondary spike 14 into the side face of a timber member will draw the timber member downwardly into firm engagement with the timber member as the knuckle 20 is drawn to the initial point of penetration. This action may be further enhanced by the provision of a chisel-shaped point to the secondary spike 14 in which the bevelled edge is on the underside of the secondary spike 14 so that the point of entry of the secondary spike 14 to the side face 16 is at a maximum distance from the member 101 so that subsequent insertion of the secondary spike 14 will draw the timber members 100 and 101 together.

Figure 12:
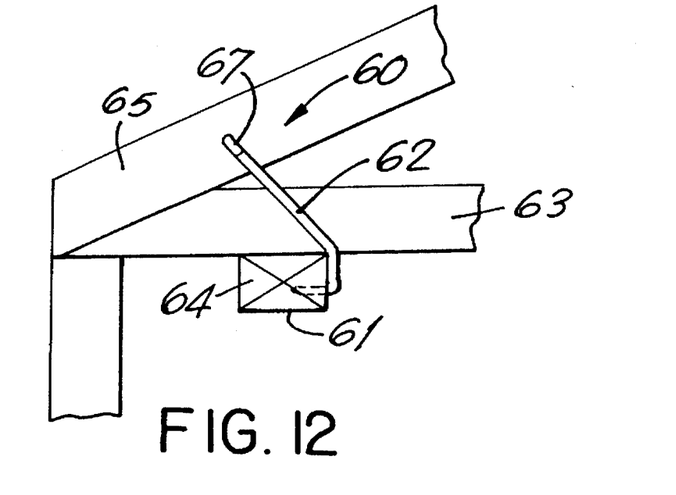
FIG. 12 illustrates the use of a truss connector.

FIG. 12 illustrates the use of a connector 60 which is similar to the connector 10 in configuration in relation to the relationship between the spikes 61 and the stem 62, however the stem 62 is longer to enable it to span an intermediate member 63 and connect together the members 64 and 65.

Figure 13:
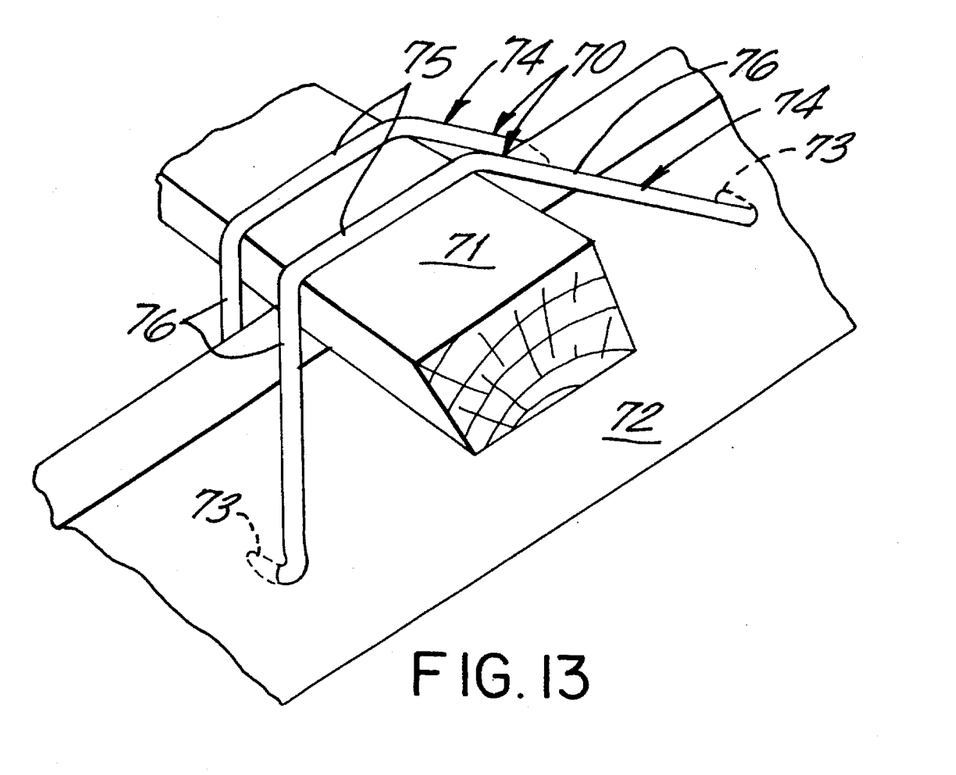
FIG. 13 illustrates use of a batten tie.
Figure 14:
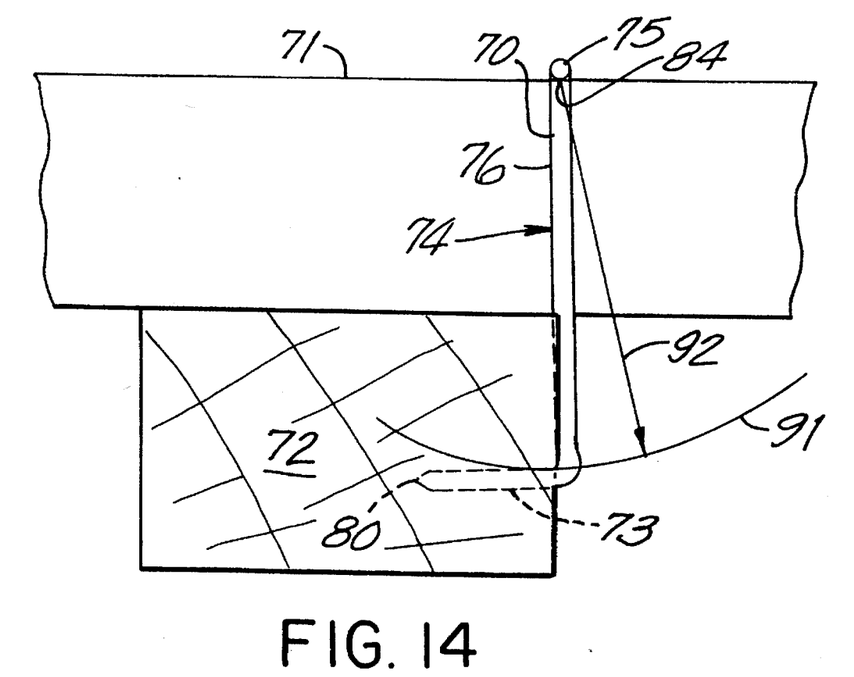
FIG. 14 illustrates the installation of the batten tie of FIG. 13.

The bridging type connector 70 is illustrated in FIGS. 12 to 14 and is adapted to secure a batten 71 to a rafter 72 or the like. This embodiment is also similar to the connector 10 in configuration in relation to the relationship between the spikes 73 and the stem portion 74. However in the embodiment of FIG. 13 both spikes 73 are disposed substantially parallel to one another and are adapted to penetrate a common side face of the rafter 72. The spikes 73 are inclined at an angle of approximately eighty degrees to the plane containing the stem portion 74 to facilitate hammering into the member 72 and tensioning. The stem portion 74 comprises a central portion 75 adapted for engagement with the rear face of the batten 71 and connector portions 76 joining the ends of the central portion 75 to the spikes 73. Suitably the connector 70 is used in pairs as illustrated, As shown in FIG. 14, the outer ends 80 of the spikes 81 fall outside an arc 82 described by radius 83 centred on the under surface 84 which abuts the batten 141. Thus, when the latter is engaged behind a batten 141 and the spikes 143 are driven into the rafter 142, the central portion 145 is progressively drawn towards the rafter 142, providing a secure clamping action between the batten 141 and the rafter 142. In order to prevent the spikes of the opposed identical connectors from penetrating the rafter 142 in a coaxial relationship and possibly splitting the rafter, the perpendicular distances between the spikes and the axis of central portion 145 differ by a significant distance.

Figure 15:
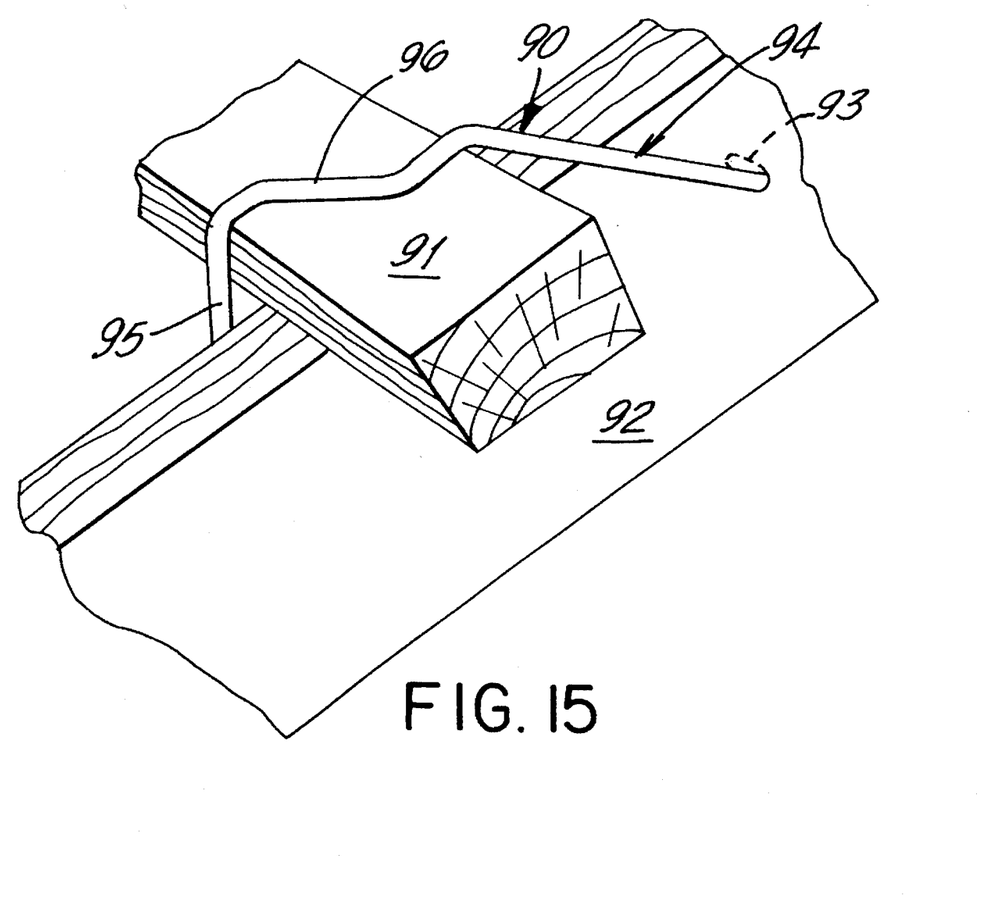
FIG. 15 illustrates an alternative batten tie.

An alternative type of batten tie 90 is illustrated in FIG. 15 and is adapted to secure a batten 91 to a rafter 92 or the like. This embodiment is also similar to the connector 10 in configuration in relation to the relationship between the spikes 93 and the stem portions 94 and 95. However in this embodiment both spikes 93 are disposed substantially parallel to one another and are adapted to penetrate opposite side faces of the member 92. The spikes 93 are inclined at an angle of approximately eighty degrees to the plane containing each respective stem portion 94 and 95 to facilitate hammering into the member 92. The stem portions 94 and 95 are linked by a central kink portion 96 to permit resilient bending of the alternative batten tie 90. Suitably the connector 90 is used in pairs with a left handed version being used to compliment a right hand version.

Since resilience is preferred in the connector of the preferred embodiment, the material of construction for the connector is selected from a suitable spring metal such as steel. Preferably, the spring steel is drawn galvanised spring wire range 1 with a tensile strength in excess of 1000 MPa and more preferably 1500 MPa. The preferred wire gauge is 3 mm to 5 mm, but more preferably 4 mm or 4.5 mm diameter. The wire may also be selected from a range of wires satisfying Australian Standard AS 1472.

It will of course be realised that the above has been given only by way of illustrative example of the invention and that all such modifications and variations thereto as would be apparent to persons skilled in the art are deemed to fall within the broad scope and ambit of the invention as defined in the appended claims.

I claim:

1. A unitary connector of a type suitable for connecting together abutting timber components of a wall frame or cross-over junction, said unitary connector having a cranked stem forming opposed straight stem portions extending away from a crank or bend, each said stem portion extending to and adjoining a respective one of two terminating spikes, each said terminating spike having a respective centreline and being adapted to penetrate a respective one of adjacent orthogonal side faces of abutting components, characterized in that:

each said stem portion includes a centreline which is contained in a common plane which also contains said centreline of one said spike, which constitutes an anchoring spike, and said centreline of the other said spike lies in a second plane which contains said centreline of said stem portion adjoining said other spike, and said second plane forming an included acute angle with said common plane whereby said other spike is inclined towards said anchoring spike, and said centreline of said other spike forms an included acute angle with said centreline of the adjoining said stem portion.

2. A connector as claimed in claim 1, wherein said included acute angle between said centreline of said other spike and said centreline of the adjoining said stem portion is in a range of 60 to 85 degrees.

3. A connector as claimed in claim 1, wherein said centreline of said anchoring spike forms an included acute angle with said centreline of the adjoining said stem portion in a range of 70 to 85 degrees.

4. A connector as claimed in claim 1, wherein said cranked stem is so cranked that said stem portions form an included obtuse angle with respect to each other and being coplanar with said common plane.

5. A connector as claimed in claim 4, wherein the obtuse angle is in the range of 115 and 155 degrees.

6. A connector as claimed in claim 1 wherein said common plane and a further plane containing said centreline of the other spike and the end of the anchoring spike remote from the adjoining stem portion form an included obtuse angle in a range of 98 to 102 degrees.

7. A connector according to claim 1, wherein the distance from the outer end of said other spike to a junction of said anchoring spike with said stem is greater than the distance between the respective junctions of said other and anchoring spikes with said stem.

8. A connector according to claim 7, wherein at least one of said spikes is formed with a chisel shape sharpened end portion in which a bevel is formed on a face portion.

9. A connector according to claim 1, wherein said stem and said spikes are bent from a length of wire and wherein said stem is resilient whereby it will deflect resiliently with respect to the adjoining spike when the latter is driven substantially perpendicularly into the side face of a timber member.

10. A connector according to claim 1, wherein the faces of said stem adjoining the spikes are planar.

11. A connector assembly comprising a complementary pair of connectors as claimed in claim 1 and each said connector being a mirror image of the other said connector, and wherein the ends of the spikes of one said connector are separated by a distance greater than the ends of the spikes of the other said connector.

* * * * *